United States Patent
Augusto et al.

(10) Patent No.: US 7,953,673 B2
(45) Date of Patent: May 31, 2011

(54) MULTIPLE INTEREST MATCHMAKING IN PERSONAL BUSINESS NETWORKS

(75) Inventors: Leonardo R. Augusto, Campinas (BR); Rodrigo Ceron Ferreira de Castro, Campinas (BR); Lucas G. Franco, Campinas (BR); Luis Gustavo P. Machado, Piracicaba (BR); Carlos E. Seo, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 676 days.

(21) Appl. No.: 11/964,740

(22) Filed: Dec. 27, 2007

(65) Prior Publication Data

US 2009/0171630 A1  Jul. 2, 2009

(51) Int. Cl.
*G06Q 99/00* (2006.01)
(52) U.S. Cl. .................... 705/319; 705/500; 705/320
(58) Field of Classification Search ............ 705/319
See application file for complete search history.

(56) References Cited

U.S. PATENT DOCUMENTS

| | | | | |
|---|---|---|---|---|
| 6,480,885 B1* | 11/2002 | Olivier | ............ | 709/207 |
| 7,167,910 B2* | 1/2007 | Farnham et al. | ............ | 709/223 |
| 7,275,068 B2* | 9/2007 | Huberman et al. | ............ | 1/1 |
| 7,325,012 B2* | 1/2008 | Nagy | ............ | 1/1 |
| 7,502,825 B2* | 3/2009 | Webb et al. | ............ | 709/205 |
| 7,672,919 B2* | 3/2010 | Becker | ............ | 706/26 |
| 7,752,227 B2* | 7/2010 | Childers et al. | ............ | 707/796 |
| 2004/0088325 A1* | 5/2004 | Elder et al. | ............ | 707/104.1 |
| 2005/0171799 A1 | 8/2005 | Hull et al. | | |
| 2005/0201290 A1 | 9/2005 | Vasudev et al. | | |
| 2005/0267940 A1* | 12/2005 | Galbreath et al. | ............ | 709/206 |
| 2006/0200435 A1 | 9/2006 | Flinn et al. | | |
| 2006/0218225 A1 | 9/2006 | Hee Voon et al. | | |
| 2008/0034074 A1* | 2/2008 | Becker | ............ | 709/223 |

FOREIGN PATENT DOCUMENTS

WO   WO 2006/040405 A1   4/2006

OTHER PUBLICATIONS

Agrawal et al., "Mining Newsgroups Using Networks Arising From Social Behavior," May 20-24 2003, 7 pages, WWW2003, Budapest, Hungary.
Chang et al., "Browsing Newsgroups with a Social Network Analyzer," Jul. 10-12, 2002, 6 pages, Proceedings from Sixth International Conference on Information Visualization, London, UK.

(Continued)

*Primary Examiner* — Traci L Casler
(74) *Attorney, Agent, or Firm* — Douglas A. Lashmit; Hoffman Warnick LLC

(57) ABSTRACT

The present invention can increase the odds of choosing the right people for a team by considering their "rate of interest/knowledge" in multiple topics. Given a known contacts network, represented by nodes interconnected by links, several different sub-networks are identified within it, corresponding to different topics or areas of expertise required to a specific project. For each sub-network, there will be nodes with an associated grade, based on that person's knowledge/interest for the topic related to that sub-network. As such, each node/person receives a grade for each topic. Using these grades, a weight of each link between the nodes is calculated. This process is performed for every node for each topic and associated grade. After that, a superposition of all sub-networks is made and a multiple interest network is yielded.

17 Claims, 6 Drawing Sheets

OTHER PUBLICATIONS

Xu et al, "Fighting organized crimes: using shortest-path algorithms to identify associations in criminal networks," Dec. 2004, pp. 473-487, Decision Support Systems, vol. 38, Issue 3. Available online at www.sciencedirect.com.

Faloutsos et al., "Connection Subgraphs in Social Networks," 12 pages, source: http://www.mccurley.org/papers/social.pdf.

Unknown, "StumbleUpon," 3 pages, retrieved from http://www.slumbleupon.com on Dec. 26, 2007.

* cited by examiner

MULTIPLE INTEREST MATCHMAKING IN PERSONAL BUSINESS NETWORKS

FIELD OF THE INVENTION

Aspects of the present invention generally relates to social networks. Specifically, an embodiment of the present invention provides for multiple interest matchmaking in personal business networks.

BACKGROUND OF THE INVENTION

When it comes to business, sometimes it is very difficult to find out which people are the best choices for gathering a team, creating a business group for a given marketing campaign, a discussion group or a business partnership, among those in your contacts network and beyond. Specifically, it is often desirable to determine: (1) who is the best fit; (2) in the right place; (3) at the right time. A number of factors can go into such a consideration. Existing systems perform only single element or topic matchmaking. That is, existing systems will identify matches where candidates have one interest in common. Such embodiments fail to provide robust and complete matchmaking. In view of the foregoing, there exists a need for an approach that solves at least one of the deficiencies in the related art.

SUMMARY OF THE INVENTION

Aspects of the present invention can increase the odds of choosing the right people for a team by considering their "rate of interest/knowledge" in multiple topics. This way, the chances of having a successful team increases considerably. Given a known contacts network, represented by nodes (persons) interconnected by links (relationships), several different sub-networks are identified within it, corresponding to different topics or areas of expertise required to a specific project. For each sub-network, there will be nodes with an associated grade, based on that person's knowledge/interest for the topic related to that sub-network. As such, each node/person receives a grade for each topic. Using these grades, a weight of each link between the nodes is calculated—an average grade of the two nodes that are connected by that link—for the links that exist in the overall contacts network. This process is performed for every node for each topic and associated grade. After that, a superposition of all sub-networks is made and a multiple interest network is yielded.

With this approach it's possible to connect isolated groups of people that, for a single topic, would not be connected at all. Now, for all nodes that have at least 4 connections, they will be marked as load-balancing/sharing nodes. Then, the shortest path will be applied using a load sharing algorithm in this resulting network, leading to a network composed of the best people to include in the team for the project, group or whatever endeavor is being undertaken.

The contacts network can be gathered in a proper software or system similar to Orkut, for instance, or, a program that reads through the people email boxes and IRC/chat logs, automatically determining the relationships and the persons rate of expertise/interest in given topics. In order to simplify the visualization of this invention, an example will be used throughout the description.

A first aspect of the present invention provides a method for forming a group of people having a related interest, comprising: defining a plurality of interest topics for a contacts network, the contacts network having a plurality of people and relationships between the plurality of people in the contacts network; establishing a sub-network with respect to every interest topic by assigning a grade to every person in the contacts network for the interest topic, and calculating, for every relationship, a weight of a relationship link between two people in the sub-network; and merging the sub-networks.

A second aspect of the present invention provides a system for forming a group of people having a related interest, comprising: a module for defining a plurality of interest topics for a contacts network, the contacts network having a plurality of people and relationships between the plurality of people in the contacts network; a module for establishing a sub-network with respect to every interest topic by assigning a grade to every person in the contacts network for the interest topic, and calculating, for every relationship, a weight of a relationship link between two people in the sub-network; and a module for merging the sub-networks.

A third aspect of the present invention provides a program product stored on a computer readable medium for forming a group of people having a related interest, the computer readable medium comprising program code for causing a computer system to: define a plurality of interest topics for a contacts network, the contacts network having a plurality of people and relationships between the plurality of people in the contacts network; establish a sub-network with respect to every interest topic by assigning a grade to every person in the contacts network for the interest topic, and calculating, for every relationship, a weight of a relationship link between two people in the sub-network; and merge the sub-networks.

A fourth aspect of the present invention provides a method for deploying a system for forming a group of people having a related interest, comprising: providing a computer infrastructure being operable to: define a plurality of interest topics for a contacts network, the contacts network having a plurality of people and relationships between the plurality of people in the contacts network; establish a sub-network with respect to every interest topic by assigning a grade to every person in the contacts network for the interest topic, and calculating, for every relationship, a weight of a relationship link between two people in the sub-network; and merge the sub-networks.

BRIEF DESCRIPTION OF THE DRAWINGS

These and other features of this invention will be more readily understood from the following detailed description of the various aspects of the invention taken in conjunction with the accompanying drawings in which.

Figure 2A:
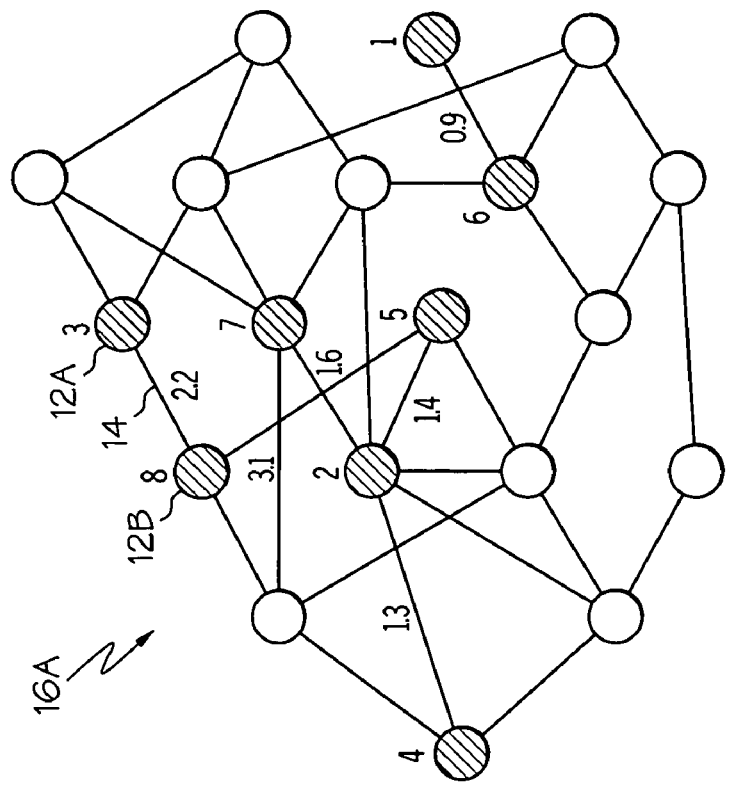
FIGS. 2A-C depict illustrative topical sub-networks according to one embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:
I. General Description
A. Synopsis
B. Details
II. Computerized Implementation

I. General Description

A. Synopsis

As indicated above, aspects of the present invention can increase the odds of choosing the right people for a team by considering their "rate of interest/knowledge" in multiple topics. This way, the chances of having a successful team can increase considerably. Given a known contacts network, represented by nodes (persons) interconnected by links (relationships), several different sub-networks are identified within it, corresponding to different topics or areas of expertise required to a specific project. For each sub-network, there will be nodes with an associated grade, based on that person's knowledge/interest for the topic related to that sub-network. As such, each node/person receives a grade for each topic. Using these grades, a weight of each link between the nodes is calculated—an average grade of the two nodes that are connected by that link—for the links that exist in the overall contacts network. This process is performed for every node for each topic and associated grade. After that, a superposition of all sub-networks is made and a multiple interest network is yielded.

With this approach it's possible to connect isolated groups of people that, for a single topic, would not be connected at all. Now, for all nodes that have at least 4 connections, they will be marked as load-balancing/sharing nodes. Then, the shortest path will be applied using a load sharing algorithm in this resulting network, leading to a network composed of the best people to include in the team for the project, group or whatever endeavor is being undertaken.

It should be understood that as used herein, people in a contact group are represented/depicted by the "nodes", while the relationships between them are represented/depicted by "links" or "relationship links". These terms may be used interchangeably herein.

B. Details

Figure 1:
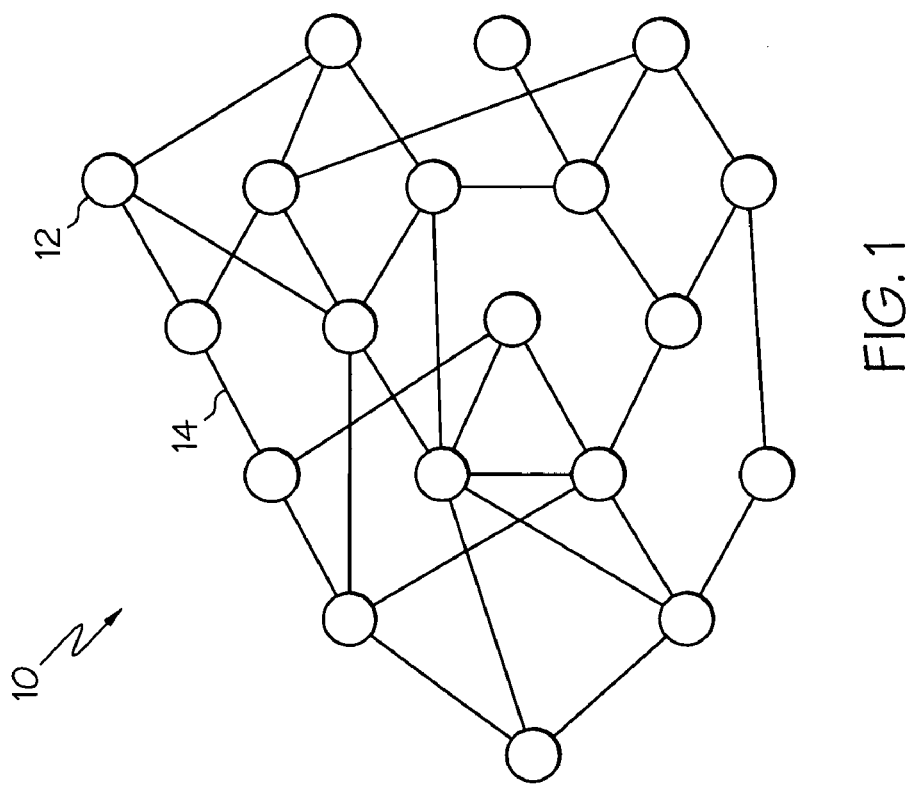
FIG. 1 depicts an illustrative contact network according to one embodiment of the present invention.

The first step can be gathering a contacts network. This could be done in different ways: (1) A dedicated application where users register and configure their interest/expertise grades for several topics, and their relationships as well; (2) a program that reads through email boxes, IRC and chat logs, automatically building the contacts network and people's interest grades for multiple topics, e.g., using some sort of "Orkut" or other similar system plug-in. These are computerized implementations that is further shown and described below in conjunction with FIG. 6. Regardless, an illustrative contacts network 10 is shown in FIG. 1. As depicted, contacts network 10 includes nodes 12 (individual people) interconnected by links 14 (relationships).

The next step is assigning each person with an expertise/interest grades for a set of topics/knowledge areas. So, for each "topic", we will have a different sub-network associated with it, composed of some nodes and links. Then, the links' weights will be computed for each sub-network. For a given sub-network, a link weight will be an average value of the grades associated with the two persons that the link connects, given by the equation below: For a particular topic: Link weight between A and B=(person A's grade*person B's grade)/(person A's grade+person B's grade).

Figure 2C:
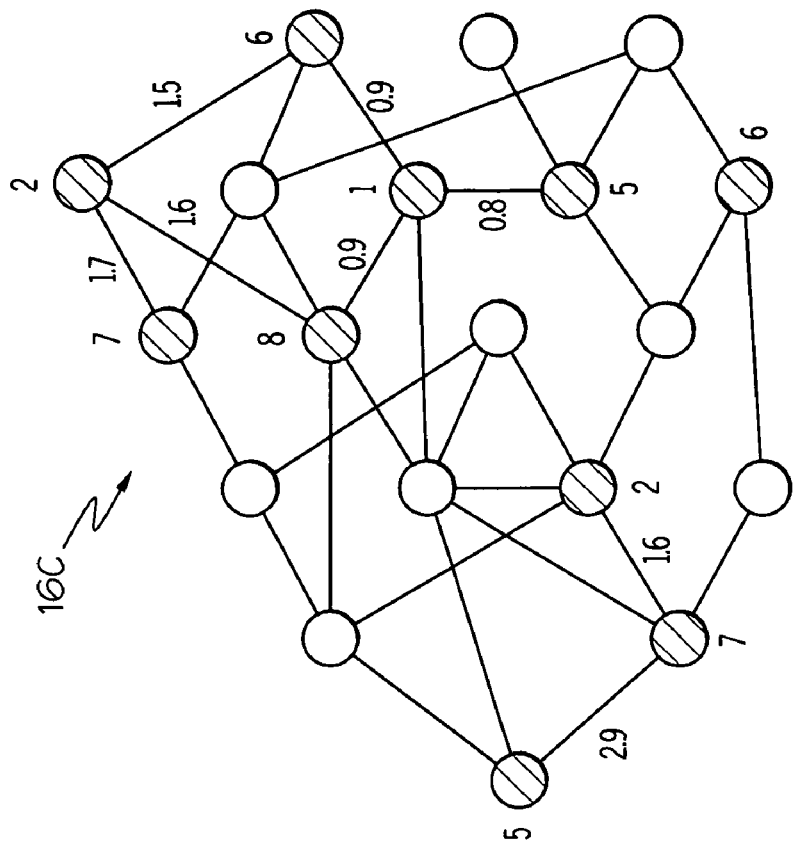
Figure 2B:
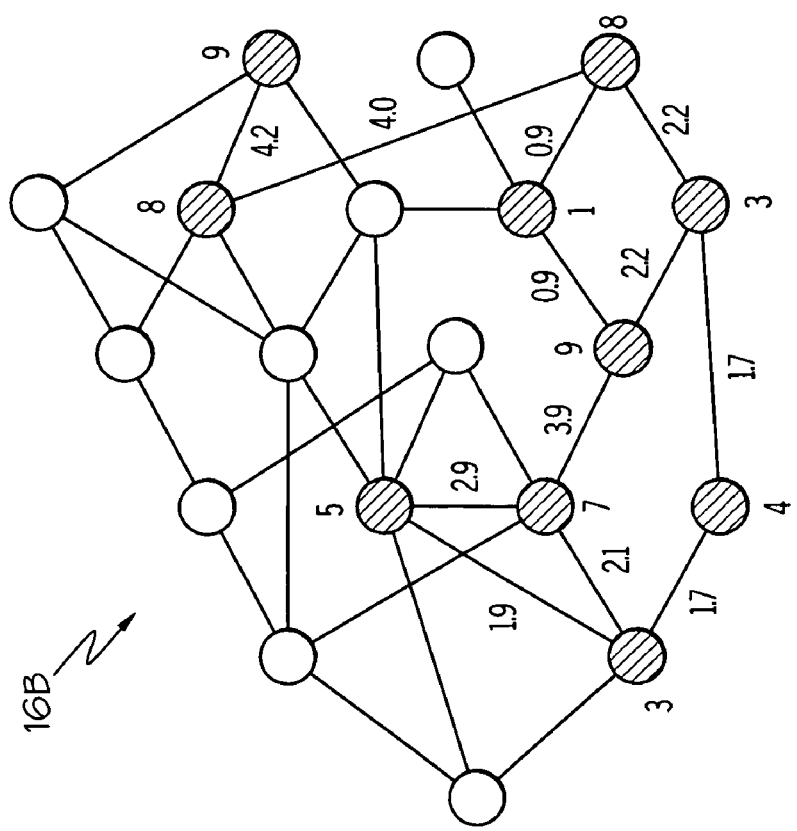

FIGS. 2A-C show three different sub-networks 16A-C associated with three different "topics" or "knowledge areas". Note that each person has a grade associated, for each sub-network, and that the links' weights have been computed using the above equation. For example, for the particular subtopic represented by sub-network 16A of FIG. 2A, node 12A had a grade of 3.0, while node 12B had a grade of 8.0. The resulting weight of link/relationship 14A is 2.2 (rounded up from 2.18) and is computed as follows:

$$(8.0 \times 3.0)/(8.0+3.0)$$

This calculation is repeated for all links on all sub-networks.

Figure 3:
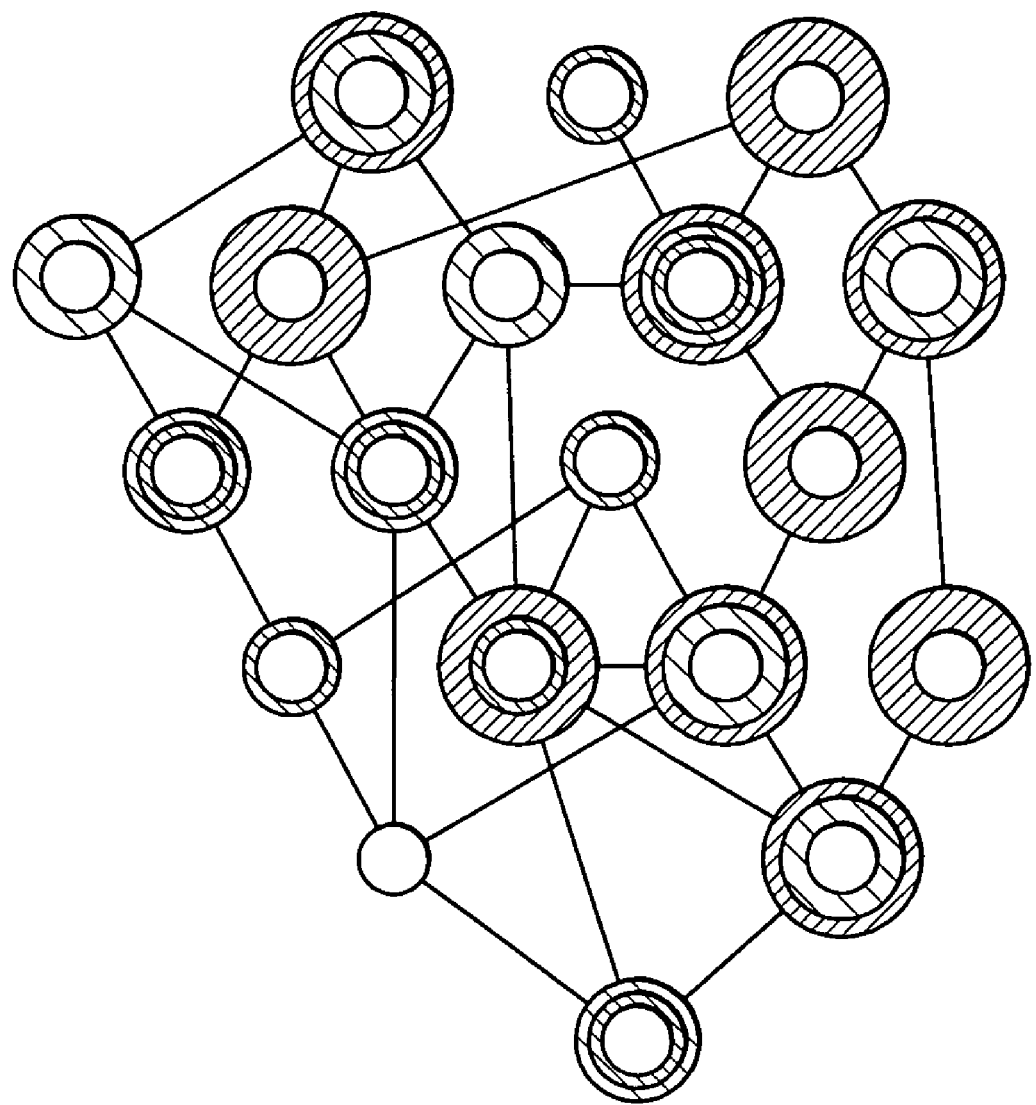
FIG. 3 depicts a network resulting from the superposition of sub-networks according to one embodiment of the present invention.
Figure 4:
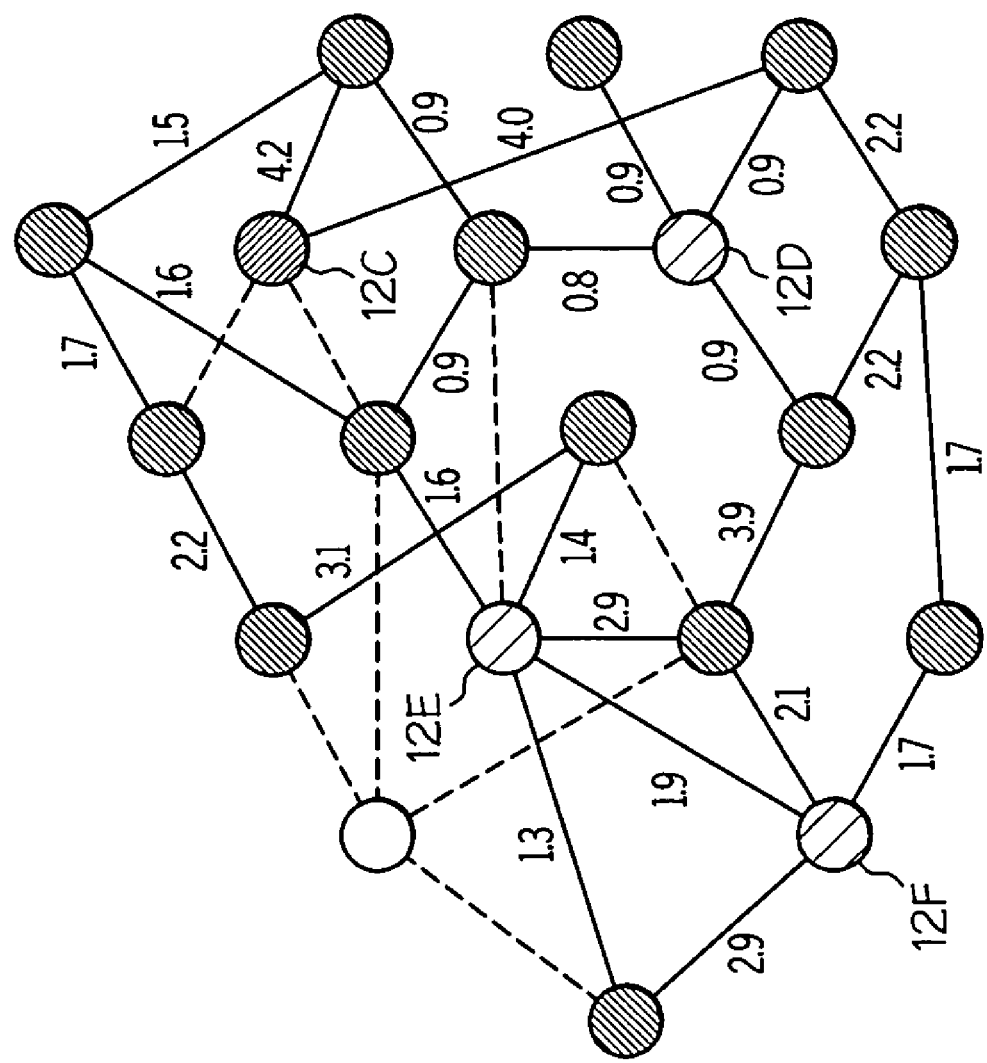
FIG. 4 depicts a resulting network with summed link weights according to one embodiment of the present invention.

Also, note that there are isolated groups of people in the sub-networks. One of the many benefits of this invention is that the isolated groups will be connected after the method is applied, you can connect different groups of people by superimposing the different sub-networks. After building the sub-networks and calculating the links weights, it's time to superimpose the sub-networks. If each sub-network is represented by a matrix, then the matrices can be summed. The resulting network is shown in different ways, in FIGS. 3-4. The user needs to identify a node which will be the starting point to form the group. This is node 12C in FIG. 4.

The next step is to identify nodes with at least four connections. One example is node 12D of FIG. 4. For these nodes, we will consider load sharing/balancing, so that the method increases the connectivity in the group and the chance of it being successful. For nodes with N>=4 connections, that node will have floor {N/2} load sharing rate. For example, if a node has six connections, the method will split the path passing through that node in 3 different ways. Nodes 12D-F are examples of load sharing nodes.

Figure 5:
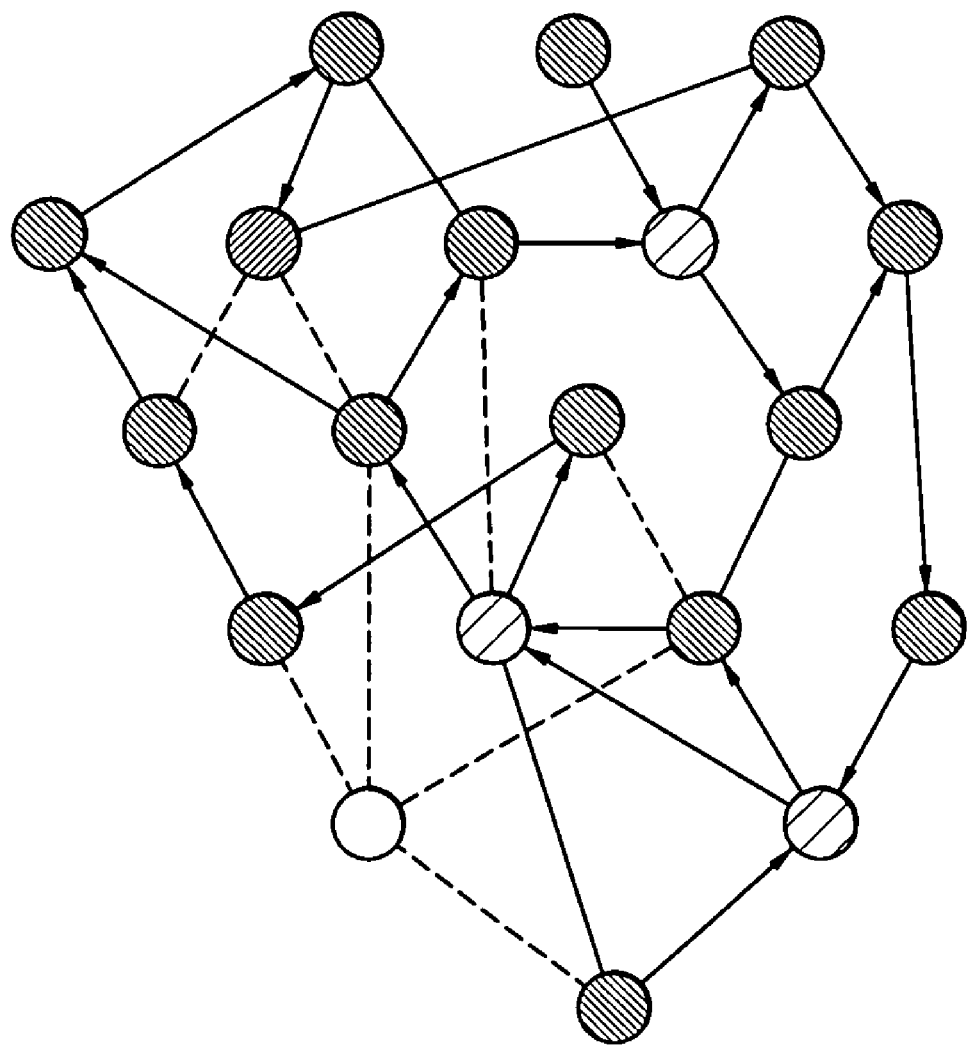
FIG. 5 depicts a best possible grouping as derived from the network of FIG. 4.

The last step is applying the shortest path with load sharing algorithm, in order to find the best group in the network, composed of all topics that the user may have indicated. The resulting network will not only indicate the best group, but also who must talk with whom in order to assure a successful connection among the people composing that group. In addition, the weights signs can be inverted in order for the next step to be performed. FIG. 5 shows an example of best possible groups. The arrows indicate who should talk to whom.

Summarizing: (1) Gather a contacts network; (2) Assign each person with a interest/expertise grade for a given set of topics, leading to multiple sub-networks; (3) For each sub-network, calculate the links weights using the equation: link weight between A, B=(A's grade*B's grade)/(A's grade+B's grade); (4) Superimpose the sub-networks-sum the matrixes; (5) Look for nodes with at least 4 connections in order to set them with load sharing, using the equation: if a node has N>=4 connections, then the path will split in floor {N/2} different ways in this node; (6) Invert the weights signs; (7) Apply the shortest path with load sharing algorithm, leading to the best possible group, indicating who must talk with who in order to assure successful connections among the group-improved multiple interest matchmaking. The example code can be found below, in the Python language. Shown also is the shortest path with the load sharing algorithm implementation.

```
import math
from numpy import *
INF = 1000
# array of nodes
nodes = [0, 1, 2, 3, 4, 5, 6, 7, 8, 9, 10, 11, 12, 13, 14, 15, 16, 17, 18]
# matrix of distances
costs = array([[0.0, 1.7, INF, INF, INF, 1.6, INF, INF, 1.5, INF, INF,
INF, INF, INF, INF, INF, INF, INF, INF],
[INF, 0.0, 2.2, INF, INF, INF, INF, INF, INF, INF, INF, INF,
INF, INF, INF, INF, INF],
[INF, INF, 0.0, INF, INF, INF, INF, INF, INF, 3.1, INF, INF, INF,
INF, INF, INF, INF, INF],
[INF, INF, INF, 0.0, INF, INF, INF, INF, INF, INF, INF, INF, INF,
INF, INF, INF, INF, INF],
[INF, INF, INF, INF, 0.0, INF, INF, INF, 4.2, INF, INF, INF, INF,
INF, INF, INF, 4.0, INF],
[INF, INF, INF, INF, INF, 0.0, 1.6, INF, INF, 0.9, INF, INF, INF,
INF, INF, INF, INF, INF],
[INF, INF, INF, INF, INF, INF, 0.0, 1.3, INF, INF, 1.4, 2.9, 1.9, INF,
INF, INF, INF, INF, INF],
[INF, INF, INF, INF, INF, INF, INF, 0.0, INF, INF, INF, INF, 2.9, INF,
INF, INF, INF, INF, INF],
[INF, INF, INF, INF, INF, INF, INF, INF, 0.0, 0.9, INF, INF, INF, INF,
INF, INF, INF, INF, INF],
[INF, INF, INF, INF, INF, INF, INF, INF, INF, 0.0, INF, INF, INF,
0.8, INF, INF, INF, INF],
[INF, INF, INF, INF, INF, INF, INF, INF, INF, INF, 0.0, INF, INF, INF,
INF, INF, INF, INF, INF],
[INF, INF, INF, INF, INF, INF, INF, INF, INF, INF, INF, 0.0, 2.1, INF,
INF, INF, INF, INF, INF],
[INF, INF, INF, INF, INF, INF, INF, INF, INF, INF, INF, INF, 0.0, INF,
INF, INF, 1.7, INF, INF],
[INF, INF, INF, INF, INF, INF, INF, INF, INF, INF, INF, INF, INF, 0.0,
0.9, INF, INF, INF, INF],
[INF, INF, INF, INF, INF, INF, INF, INF, INF, INF, INF, INF, INF, INF,
0.0, 0.9, INF, 0.9, INF],
[INF, INF, INF, INF, INF, INF, INF, INF, INF, INF, INF, INF, INF, INF,
INF, 0.0, INF, INF, 2.2],
[INF, INF, INF, INF, INF, INF, INF, INF, INF, INF, INF, INF, INF, INF,
INF, INF, 0.0, INF, 1.7],
[INF, INF, INF, INF, INF, INF, INF, INF, INF, INF, INF, INF, INF, INF,
INF, INF, INF, 0.0, 2.2],
[INF, INF, INF, INF, INF, INF, INF, INF, INF, INF, INF, INF, INF, INF,
INF, INF, INF, INF, 0.0]])
# load sharing array
Ls = [1, 1, 1, 1, 1, 1, 2, 1, 1, 1, 1, 1, 2, 1, 2, 1, 1, 1, 1]
# destination node
initial = 4
# completes a sup triang matrix
def tri_to_full(a = [ ]):
if a is None:
return [ ]
for i in range(0, len(a[0])):
for j in range(i, len(a)):
if i != j:
a[j][i] = a[i][j]
return a
# inverts signs
def invert_signs(a = [ ]):
if a is None:
return [ ]
for i in range(0, len(a[0])):
for j in range(i, len(a)):
if i != j and a[i][j] != INF:
a[i][j] = −a[i][j]
return a
# creates a copy of the given list
def list_copy(list1 = None):
if list1 is None:
return [ ]
tmp_list = [ ]
for elem in list1:
tmp_list.append(elem)
return tmp_list
# shortest path with load sharing
# d = cost matrix (i, j)
# V = array of nodes
# L = load sharing array
# j = destination node
def spls(d, V, L, j):
# init
T = [j]
U = list_copy(V)
y = [ ]
v = [ ]
s = [ ]
for k in range(0, len(U)):
y.append(INF)
v.append([ ])
s.append([ ])
for r in range(0, L[k]):
v[k].append(INF)
s[k].append(−1)
U.remove(j)
y[j] = 0
v[j] = [0]
s[j] = [j]
# find shortest path with load sharing
while U != [ ]:
for k in U:
# update partial costs and the node's sucessors
x = argmax(v[k])
if y[j] + d[k][j] < v[k][x]:
v[k][x] = y[j] + d[k][j]
if v[k][x] < INF / 2:
s[k][x] = j
# update effective cost
tmp = (INF * ones(len(V))).tolist( )
for k in U:
if INF not in v[k]:
y[k] = sum(v[k]) / L[k]
else:
y[k] = INF
tmp[k] = y[k]
j = argmin(tmp)
T.append(j)
U.remove(j)
return s
costs = tri_to_full(invert_signs(costs))
print spls(costs, nodes, Ls, initial)
```

II. Computerized Implementation

Figure 6:
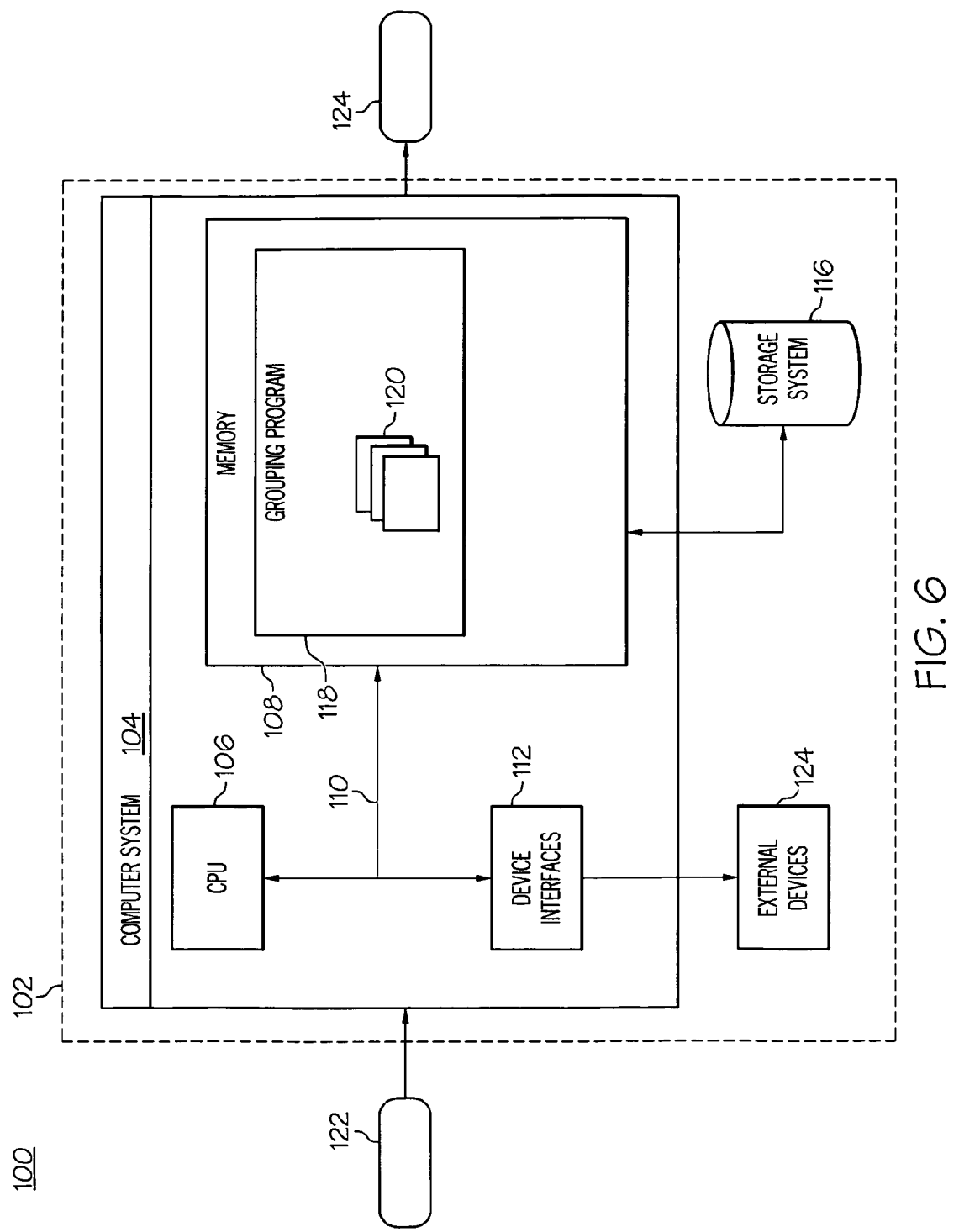
FIG. 6 shows a more specific computerized implementation according to an embodiment of the present invention.

Referring now to FIG. 6, a computerized implementation 100 of the present invention is shown. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets—based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

As shown, computer system 104 includes a processing unit 106, a memory 108, a bus 110, and device interfaces 112. Further, computer system 104 is shown having storage system 116 that communicates with bus 110 via device interfaces 112. In general, processing unit 106 executes computer program code, such as grouping program 118. While executing computer program code, processing unit 106 can read and/or write data to/from memory 108, storage system 116, and/or device interfaces 112. Bus 110 provides a communication link between each of the components in computer system 104. Although not shown, computer system 104 could also include I/O interfaces that communicate with: one or more external devices such as a kiosk, a checkout station, a keyboard, a pointing device, a display, etc.); one or more devices that enable a user to interact with computer system 104; and/or any devices (e.g., network card, modem, etc.) that enable computer system 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process of the invention. Moreover, computer system 104 is only representative of various possible computer systems that can include numerous combinations of hardware. To this extent, in other embodiments, computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, device interfaces 112 can comprise any module for exchanging information with one or more external devices. Still further, it is understood that one or more additional components (e.g., system software, math co-processing unit, etc.) not shown in FIG. 6 can be included in computer system 104.

Storage system 116 can be any type of system capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into computer system 104.

Shown in memory 108 of computer system 104 is grouping program 24, which includes a set of modules 120. The modules generally provide the functions of the present invention as described herein. Specifically (among other things), set of modules 120 is configured to: gather a contacts network (e.g., possibly working with email programs (not shown), etc.); define a plurality of interest topics for a contacts network; establish a sub-network with respect to every interest topic by assigning a grade to every person in the contacts network for the interest topic; calculate, for every relationship, a weight of a relationship link between two people in the sub-network; merge the sub-networks; identify a staring point node (e.g., a node having at least four relationships); apply a shortest path with a load sharing algorithm, in order to find a best group in the contacts network While shown and described herein as multiple interest matchmaking, it is understood that the invention further provides various alternative embodiments. For example, in one embodiment, the invention provides a computer-readable/useable medium that includes computer program code to enable a computer infrastructure to provide multiple interest matchmaking. To this extent, the computer-readable/useable medium includes program code that implements each of the various process of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 6) and/or storage system 116 (FIG. 6) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to provide multiple interest matchmaking. In this case, the service provider can create, maintain, support, etc., a computer infrastructure, such as computer infrastructure 102 (FIG. 6) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for multiple interest matchmaking. In this case, a computer infrastructure, such as computer infrastructure 102 (FIG. 6), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 104 (FIG. 6), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method, performed on a computer system, for forming a group of people having a related interest, comprising:
using the computer system to perform the following:
defining a plurality of interest topics for a contacts network, the contacts network having a plurality of people and relationships between the plurality of people in the contacts network;
establishing a sub-network with respect to every interest topic by assigning a grade to every person in the contacts network for the interest topic, and calculating, for every relationship, a weight of a relationship link between two people in the sub-network, wherein a first person is represented by a first node (A) and a second person is represented by a second node (B), and wherein the calculating comprises calculating a weight of a relationship between the first node (A) and the second node (B) using the following equation: A, B=(A's grade* B's grade)/(A's grade+B's grade); and
merging the sub-networks into a multiple interest network.

2. The method of claim 1, further comprising:
identifying a starting point node within the multiple interest network; and
applying a shortest path with a load sharing algorithm, in order to find a best group in the contacts network.

3. The method of claim 2, the identifying of the starting point node comprising identifying a node within the multiple interest network having at least four relationships.

4. The method of claim 2, the load sharing algorithm comprising: if the starting point node has N>=4 connections, then the path will split in floor {N/2} different ways in this node.

5. The method of claim 1, further comprising gathering the contacts network.

6. A computer system comprising:
at least one processing unit;
memory operably associated with the at least one processing unit;
a grouping program that is storable in memory and executable by the at least one processing unit for forming a group of people having a related interest, the grouping program comprising:
a module for defining a plurality of interest topics for a contacts network, the contacts network having a plurality of people and relationships between the plurality of people in the contacts network;
a module for establishing a sub-network with respect to every interest topic by assigning a grade to every person in the contacts network for the interest topic, and calculating, for every relationship, a weight of a relationship link between two people in the sub-network, wherein a first person is represented by a first node (A) and a second person is represented by a second node (B), and wherein the calculating comprises calculating a weight of a relationship between the first node (A) and the second node (B) using the following equation: A, B=(A's grade*B's grade)/(A's grade+B's grade); and
a module for merging the sub-networks into a multiple interest network.

7. The computer system of claim 6, further comprising:
a module for identifying a starting point node within the multiple interest network; and
a module for applying a shortest path with a load sharing algorithm, in order to find a best group in the contacts network.

8. The computer system of claim 7, the module for identifying the starting point node being configured to identify a node within the multiple interest network having at least four relationships.

9. The computer system of claim 7, the load sharing algorithm comprising: if the starting point node has N>=4 connections, then the path will split in floor {N/2} different ways in this node.

10. The computer system of claim 6, further comprising a module for gathering the contacts network.

11. A program product stored on a computer readable storage medium, which when executed by a computer system, forms a group of people having a related interest, the computer readable storage medium comprising program code for causing a computer system to:
define a plurality of interest topics for a contacts network, the contacts network having a plurality of people and relationships between the plurality of people in the contacts network;
establish a sub-network with respect to every interest topic by assigning a grade to every person in the contacts network for the interest topic, and calculating, for every relationship, a weight of a relationship link between two people in the sub-network, wherein a first person is represented by a first node (A) and a second person is represented by a second node (B), and wherein the calculating comprises calculating a weight of a relationship between the first node (A) and the second node (B) using the following equation: A, B=(A's grade* B's grade)/(A's grade+B's grade); and
merge the sub-networks into a multiple interest network.

12. The program product of claim 11, the computer readable medium further comprising program code for causing the computer system to:
identify a starting point node within the multiple interest network; and
apply a shortest path with a load sharing algorithm, in order to find a best group in the contacts network.

13. The program product of claim 12, the wherein the program code for identifying of the starting point node comprises causing the computer system to: identify a node within the multiple interest network having at least four relationships.

14. The program product of claim 12, the load sharing algorithm comprising: if the starting point node has N>=4 connections, then the path will split in floor {N/2} different ways in this node.

15. The program product of claim 11, the computer readable medium further comprising program code for causing the computer system to: gather the contacts network.

16. A method for deploying a system for forming a group of people having a related interest in a computer system, the method comprising:

providing a computer infrastructure being operable to:

define a plurality of interest topics for a contacts network, the contacts network having a plurality of people and relationships between the plurality of people in the contacts network;

establish a sub-network with respect to every interest topic by assigning a grade to every person in the contacts network for the interest topic, and calculating, for every relationship, a weight of a relationship link between two people in the sub-network, wherein a first person is represented by a first node (A) and a second person is represented by a second node (B), and wherein the calculating comprises calculating a weight of a relationship between the first node (A) and the second node (B) using the following equation: A, B=(A's grade*B's grade)/(A's grade+B's grade); and merge the sub-networks into a multiple interest network.

17. The method of claim 16, the computer infrastructure being further operable to:

identify a starting point node within the multiple interest network; and apply a shortest path with a load sharing algorithm, in order to find a best group in the contacts network.

\* \* \* \* \*